April 19, 1955  G. GULJAS ET AL  2,706,527
PROTECTIVE DEVICE FOR GASOLINE TANKS
Filed Jan. 28, 1952  2 Sheets-Sheet 1

INVENTORS:
GEZA GULJAS, LADISLAV SLAVIC,
AND MILIVOJ STEFANOVIC
BY
Michael S. Striker
agt.

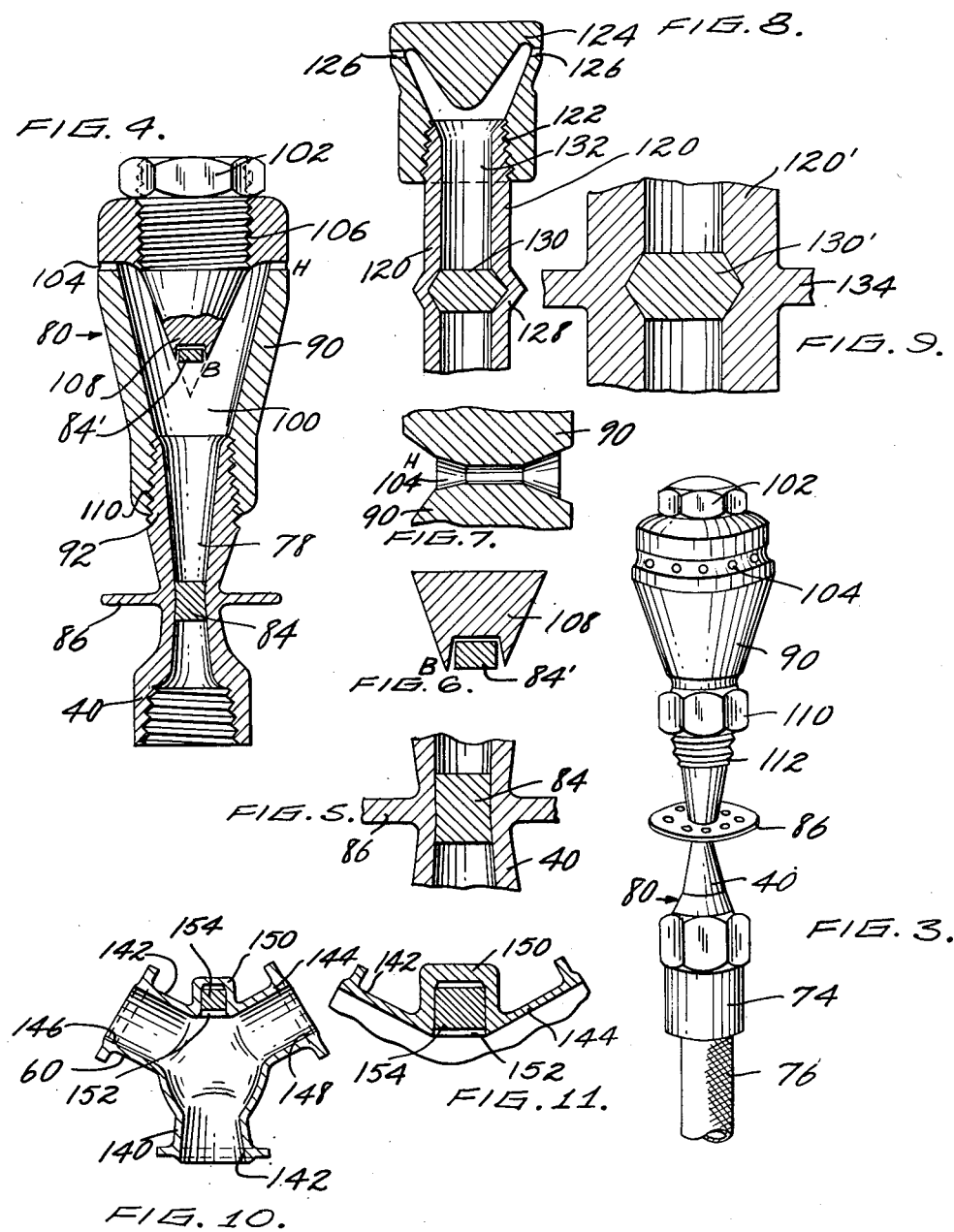

United States Patent Office 2,706,527
Patented Apr. 19, 1955

2,706,527

PROTECTIVE DEVICE FOR GASOLINE TANKS

Geza Guljas, Ladislav Slavic, and Milivoj Stefanovic, Novi Sad, Yugoslavia, assignors to Federativna Narodna Republika Jugoslavija Savet Za Industriju I Gradjevinarstvo Vlade F. N. R. J., Belgrade, Yugoslavia Application January 28, 1952, Serial No. 268,628

11 Claims. (Cl. 169—4)

The present invention relates to a protective device for tanks containing an inflammable liquid such as gasoline.

It is an object of the present invention to provide a protective device protecting the tank against the danger of inflammation of the liquid.

It is another object of the present invention to provide a protective device protecting the tank against damage by an explosion of the vapors of the inflammable liquid.

It is a further object of the present invention to provide a protective device which is automatically put into operation by the burning of the inflammable liquid in the tank.

A protective device according to the present invention comprises in its broadest aspects a source of a protective substance, a device connected to the source and arranged in the tank above the level of the liquid therein, the device spreading the protective substance as a layer on the surface of the liquid, and temperature responsive means arranged in the device for obstructing the passage of the protective substance through the device below a predetermined temperature of the obstructing means, whereby as soon as the predetermined temperature is reached, the obstructing means allows the passage of the protective substance through the device so that the protective substance is spread as a layer on the surface of the inflammable liquid within the tank.

Preferably a member floats in the liquid near the surface thereof and the spreading device is arranged on the floating member above the surface of the liquid.

Preferably the spreading device is formed by nozzle means having an exit opening above the level of the liquid in the tank.

In a preferred embodiment of the present invention the temperature-responsive means for obstructing the passage of the protective substance through the spreading device is formed by a fuse preferably consisting of a low melting metal alloy such as a bismuth alloy.

In a preferred embodiment of the present invention screw means are associated with the nozzle means and serve for adjusting the volume of the protective substance flowing through the boring of the nozzle means.

Preferably an extension is formed in one piece with the nozzle means and arranged substantially at the portion thereof accommodating the fuse so that the fuse is maintained in heat exchange with the gas surrounding the nozzle means.

In a preferred embodiment of the present invention a plurality of diaphragms is arranged in the roof of the tank, preferably near the perimeter thereof, the diaphragms being at least partly broken when an explosion occurs in the tank.

A preferred embodiment of the present invention comprises distributor means connected to the source and arranged on the floating member above the surface of the liquid, a plurality of nozzle means connected to the distributor means, the nozzle means having each exit openings arranged above the level of the liquid in the tank so as to spread the protective substance as a plurality of layers on the surface of the liquid, and fuses arranged, respectively, in the distributor means and the nozzle means for obstructing the passage of the protective substance through the distributor means and the nozzle means below a predetermined temperature of the fuses, whereby as soon as the predetermined temperature is reached, the fuses allow the passage of the protective substance through the distributor means and the nozzle means.

Preferably means are arranged in the distributor means for collecting the material of the fuse after the blowing thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 3 is a perspective view of part of the protective device shown in Fig. 1;

Fig. 4 is a longitudinal section through the part shown in Fig. 3;

Figs. 5, 6 and 7 are, respectively, sectional elevations of details of the device shown in Fig. 4, the details being shown on an enlarged scale;

Fig. 8 is a modification of the device shown in Fig. 4;

Fig. 9 shows on an enlarged scale a modification of the middle part of Fig. 8;

Fig. 10 is a sectional elevation of another part of the protective device shown in Fig. 1; and Fig. 11 is a sectional elevation showing a detail of Fig. 10 on an enlarged scale.

Figure 1:
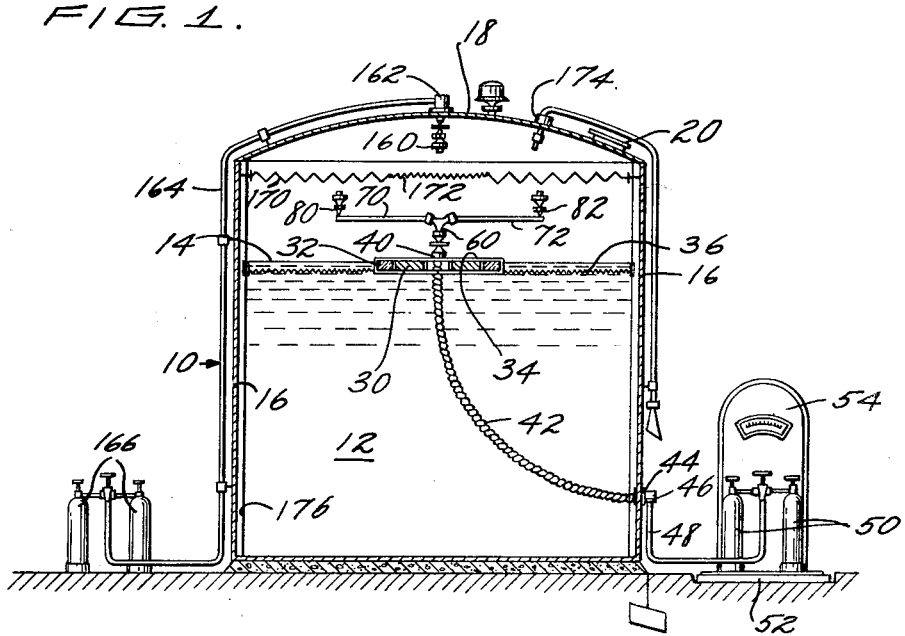
Fig. 1 is an elevation partly in section of a gasoline tank provided with a protective device according to the invention.
Figure 2:
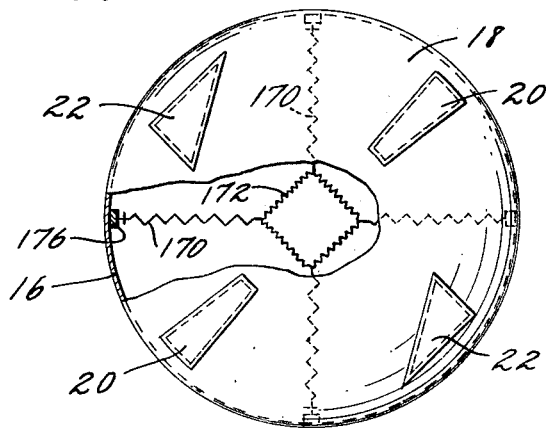
Fig. 2 is a plan view of the gasoline tank shown in Fig. 1.

Referring now to the drawings and first to Figs. 1 and 2, 16 is the cylindrical wall of a tank 10 containing an inflammable liquid 12 such as gasoline the upper level of which is denoted by 14. The tank 10 has a domed roof 18 and is shown as a structure erected above ground; it should, however, be understood that the tank could be a subterraneous structure, if desired.

The roof 18 is provided with a plurality of diaphragms such as 20 or 22 which are arranged near the perimeter of the roof 18 and shaped as circular segments (diaphragms 20) or as triangles (diaphragms 22). At least two diaphragms such as 20 should be arranged on opposite ends of a diameter of the roof 18. However, it is preferable to arrange four diaphragms which are staggered at right angles to one another, as shown in Fig. 2. The diaphragms 20, 22 consist preferably of copper sheet having a thickness of 0.5 mm. and are soldered at the margins thereof to the roof 18 so that they provide a hermetical seal. The diaphragms 20 should have a length of 400–500 mm. and a width at the basis amounting to 300 mm. The diaphragms 20, 22 are broken if an explosion of the vapors inside the tank 10 occurs which causes a detonation wave which is particularly strong in the space inside the tank 10 underneath the roof 18, and particularly at the corners formed by the roof 18 with the cylindrical wall 16 of the tank 10.

Near the surface 14 of the liquid 12 a member 30 is floating the outer perimeter of which is formed by a heavy metal 32 such as lead pulling the member or float 30 into the liquid 12 so that the upper side 34 thereof is above the surface 14 of the liquid. The perimeter of the float 30, 32, is connected to a metal mesh 36 guided by rods 176 and consisting of aluminum or the like and diminishing the evaporation of the gasoline in case of a fire because the mesh 36 withdraws the heat from the gasoline and conducts it to the cylindrical wall 16. It will be seen from Fig. 1 that the perimeter of metal mesh 36 is so mounted as to be slidable along rods or the like arranged vertically in the tank 10 and connected at least at their upper ends to the walls of the tank.

In the embodiment shown in Fig. 1 the upper side 34 of the member 30 is provided at the center thereof with a nozzle-like device 40 to be described hereinafter more in detail in connection with Figs. 3 and 4. The nozzle 40 is connected at the lower end thereof to a flexible connection 42 passing through the liquid 12 and through an opening in the cylindrical wall 16 which is sealed by a gasket 44. The connection 42 is connected to the end piece 46 of a connection 48 the other end of which is connected to two bombs 50 containing a protective substance such as $CO_2$ which are arranged on the platform 52 of a balance 54 by which the weight of the bombs 50 can be ascertained which depends on the condition of filling of the same.

The other end of the nozzle member 40 is connected to a distributor means 60 to be described more in detail hereinafter with reference to Figs. 10 and 11. The distributor means 60 is connected to two connections 70 and 72 the ends of which are in turn connected to nozzle-like members 80 and 82 which are described more in detail hereafter.

Referring now to Figs. 3 and 4, one of the nozzle means 80 or 82 is shown in detail. The nozzle means 80 comprises a lower nozzle-like member 40 shaped exactly in the same manner as that mentioned hereinabove, and an upper nozzle member or portion 90, the two members being connected to each other by a screw thread 92. The lower end of the nozzle-like member 40 is connected by a sleeve 74 to one end 76 of the connection 70 or of the connection 42. The member 40 has a double conical boring 78, the most restricted portion of which contains a plug 84 consisting of a low melting metal alloy such as an alloy of bismuth with lead, tin and cadmium. The nozzle means 40 are formed, preferably in one piece, with an extension 86 preferably designed as a circular disc and arranged substantially at the portion of the nozzle member 40 accommodating the plug 84 so that the same is maintained in heat exchange with the gas surrounding the nozzle means 40. It should be understood that the plug 84 forms a fuse which is blown out by the protective substance such as the $CO_2$ entering the lower part of the nozzle means 40 connected to the bombs 50, if and when a predetermined temperature has been reached by the fuse 84. After the blowing of the fuse 84 the protective substance such as $CO_2$ can proceed into the upper part of the nozzle member 40 and reaches the boring 100 of the upper portion 90 of the nozzle means 80 which is closed at the upper end thereof by a screw means such as a bolt 102 to be described more in detail hereinafter. The protective substance such as $CO_2$ can escape from the boring 100 through a plurality of exit openings 104 so that it is spread in a circular layer on the surface 14 of the liquid 12. The exit openings 104 are shown at a larger scale in Fig. 7. It will be understood that the nozzle means 80 form an atomizer or sprayer, the inner boring 78, 100 of which forms a channel enlarging step by step so that the $CO_2$ leaves the nozzle means 80 as a snow collecting on the springs 170 or screen 172 to be described more in detail hereinafter and on the surface 14 of the liquid 12.

The bolt 102 is screwed by a thread 106 into the upper portion 90 and provided with a tapering lower portion 108 forming a seat for the fuse 84' after the same has been melted and blown out by the pressure of the $CO_2$. By screwing the bolt 102 more or less into the upper member 90 the volume of the protective substance such as the $CO_2$ flowing through the boring 100 of the nozzle means 80 and be adjusted, thereby adjusting the quantity of the protective substance escaping through the exit openings 104.

The lower end of the lower portion 90 can be formed as a screw nut 110 to be screwed on an outer thread 112 of the nozzle member 40. The internal thread of the nut 110 and the thread 112 form together the thread 92 connecting the upper portion 90 and the lower portion 40.

The members 40, 90 and 102 preferably consist of anticorrosive material such as copper and/or brass.

Referring now to Fig. 8, a modification of the device shown in Fig. 4 is shown which comprises a lower nozzle member 120 connected by a thread 122 to an upper nozzle member 124 provided with a plurality of exit openings 126. The lower member 120 has an enlarged part 128 for the accommodation of a lens-shaped fuse 130 consisting of a low melting metal alloy such as an alloy of bismuth, lead, tin, and cadmium. In this embodiment the volume of the $CO_2$ passing through the boring 132 of the nozzle is not adjustable.

Referring now to Fig. 9 showing a modification of the embodiment shown in Fig. 8, the lower member 120' is provided with an extension 134 similar to the extension 86 of Fig. 4 and arranged at the middle plane of the lens-shaped metal alloy 130'.

Referring now to Figs. 10 and 11 showing the distributor means 60, these means comprise an inlet 140 provided with an inner thread 142 which can be screwed to the outer thread 112 of the lower portion 40 shown in Figs. 3 and 4. Furthermore, the distributor means 60 has two exits 142 and 144 which are provided with inner threads 146 and 148 for accommodating therein the ends of the connections 70 and 72, respectively, shown in Fig. 1. The upper middle portion of the distributor means 60 is provided with an extension 150 forming a recess 152 for accommodating a fuse 154 after the same has been blown out from its regular seat within the lower portion 140 of the distributor means 60.

It is to be understood that the fuses should be arranged 80 to 100 mm. above the surface 14 of the liquid 12 and that the spraying range of the nozzles 80, 82, amounts to 10 to 12 meters depending on the gas pressure in the bombs 50.

Referring now once more to Figs. 1 and 2, a spraying device 160 designed in the same manner as the spraying device 80, 82, but turned upside down, is arranged below the center of the roof 18 and connected to a connecting piece 162 arranged above the roof 18 to a connection 164 leading to two bombs 166. The connecting piece 162 can be formed as a valve regulating the pressure inside the tank during normal operation.

Springs 170 and a screen 172 are provided in the tank above the nozzle means 80 and 82. The springs 170 and the screen 172 consist preferably of aluminum and take a deposit of the snow of $CO_2$ leaving the nozzle devices 80 and 82 so that the temperature of the springs 170 and the screen 172 is very low and forms a counteragent against the high temperature of the burning gasoline.

174 is an electrically operating device responsive to temperature which actuates signals below and above the critical temperature.

The operation of this device is as follows:

In case that an explosion occurs within the tank the diaphragms 20, 22 are at least partly broken so that a connection of the high pressure gases with the atmosphere is established. The explosion is accompanied by an increase of temperature which causes a melting of the fuse in the distributing means 60 and the nozzle means 80 and 82 within about 8 to 10 seconds whereupon the protective substance such as $CO_2$ is delivered by the nozzle means 80 and 82. In addition the nozzle means 160 is operated. The nozzle means 80, 82 and 160 cause a snow of $CO_2$ to be deposited on the surface 14 of the liquid 12, the whole process taking about 10 seconds so that no appreciable fire can develop after the explosion.

If a fire is caused within the tank without being preceded by an explosion, the rise of temperature is slower. However, $CO_2$ will be admitted to the tank as soon as the fuses within the distributor means 60 and the nozzle means 80, 82 and 160 melt.

If lens-shaped fuses as shown in Figs. 8 and 9, are used, the process of blowing out takes about 15 to 20 seconds longer than the blowing out of the conical fuses 84.

The weight of the bombs 50 can be ascertained by the balance 54 so as to ascertain the loss of weight of the bombs 50 thus giving an indication that the bombs 50 need a refilling.

It is to be understood that the nozzle member 40 mounted on the top surface 34 of the float 30 can be directly connected to an upper portion such as 90 if the dimensions of the tank are small enough. In this case the distributor means 60 can be dispensed with.

Furthermore, it is to be understood that the bombs 50 may be arranged on the float 30 so that they are inside the tank. In order to indicate in this case the weight of the bombs 50 the float 30 may be provided with a counterweight indicating the position of the float with respect to the level of the liquid in the tank.

Another method of indicating the operation of the device consists in that by the sudden discharge of $CO_2$ into the space above the liquid 12 either the temperature-responsive device 174 may be actuated or the diaphragms 20, 22 may be broken.

It will be understood that each of the elements described above, or two or more together, may also find a useful application in other types of protective devices differing from the types described above.

While the invention has been illustrated and described as embodied in a protective device for tanks containing an inflammable liquid, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A protective device for tanks containing an inflammable liquid comprising, in combination, a source of a protective fluid adapted to be transformed into at least semi-solid state upon contact with air; means for dispensing the protective fluid into the interior of the tank over the inflammable liquid where it is transformed into at least semi-solid state; and metallic mesh means in the tank extending slightly under the upper surface of the inflammable liquid, said metallic mesh means being connected at its periphery to the wall of the tank, thereby diminishing the evaporation of the inflammable liquid in case of fire by withdrawing the heat therefrom and conducting it away from the surface thereof to the tank wall.

2. A protective device for tanks containing an inflammable liquid comprising, in combination, a source of a protective fluid adapted to be transformed into at least semi-solid state upon contact with air; means floating on the inflammable liquid for dispensing the protective fluid into the interior of the tank over the inflammable liquid where it is transformed into at least semi-solid state; and metallic mesh means in the tank extending slightly under the upper surface of the inflammable liquid, said metallic mesh means being connected at its periphery to the wall of the tank, thereby diminishing the evaporation of the inflammable liquid in case of fire by withdrawing the heat therefrom and conducting it away from the surface thereof to the tank wall.

3. A protective device for tanks containing an inflammable liquid comprising, in combination, a source of a protective fluid adapted to be transformed into at least semi-solid state upon contact with air; temperature responsive means connected to said source operable at a predetermined temperature for automatically dispensing the protective fluid into the interior of the tank over the inflammable liquid where it is transformed into at least semi-solid state; and metallic mesh means in the tank extending slightly under the upper surface of the inflammable liquid, said metallic mesh means being connected at its periphery to the wall of the tank, thereby diminishing the evaporation of the inflammable liquid in case of fire by withdrawing the heat therefrom and conducting it away from the surface thereof to the tank wall.

4. A protective device for tanks containing an inflammable liquid comprising, in combination, a source of a protective fluid adapted to be transformed into at least semi-solid state upon contact with air; temperature responsive means floating on the infammable liquid connected to said source operable at a predetermined temperature for automatically dispensing the protective fluid into the interior of the tank over the inflammable liquid where it is transformed into at least semi-solid state; and metallic mesh means in the tank extending slightly under the upper surface of the inflammable liquid, said metallic mesh means being connected at its periphery to the wall of the tank, thereby diminishing the evaporation of the inflammable liquid in case of fire by withdrawing the heat therefrom and conducting it away from the surface thereof to the tank wall.

5. A protective device for tanks containing an inflammable liquid comprising, in combination, a source of carbon dioxide adapted to be transformed into solid state upon contact with air; means for dispensing the carbon dioxide into the interior of the tank over the inflammable liquid where it is transformed into solid state; and metallic mesh means in the tank extending slightly under the upper surface of the inflammable liquid, said metallic mesh means being connected at its periphery to the wall of the tank, thereby diminishing the evaporation of the inflammable liquid in case of fire by withdrawing the heat therefrom and conducting it away from the surface thereof to the tank wall.

6. A protective device for tanks containing an inflammable liquid comprising, in combination, a source of protective fluid adapted to be transformed into at least semi-solid state upon contact with air; means floating on the inflammable liquid for dispensing the protective fluid into the interior of the tank over the inflammable liquid where it is transformed into at least semi-solid state; network means in the tank spaced from and extending over the surface of the inflammable liquid for receiving and holding at least part of the thus transformed at least semi-solid protective fluid; and metallic mesh means in the tank extending slightly under the upper surface of the inflammable liquid, said metallic mesh means being connected at its periphery to the wall of the tank, thereby diminishing the evaporation of the inflammable liquid in case of fire by withdrawing the heat therefrom and conducting it away from the surface thereof to the tank wall.

7. A protective device for tanks containing an inflammable liquid comprising, in combination, a source of a protective fluid adapted to be transformed into at least semi-solid state upon contact with air; temperaure responsive means floating on the inflammable liquid connected to said source operable at a predetermined temperature for automatically dispensing the protective fluid into the interior of the tank over the inflammable liquid where it is transformed into at least semi-solid state; network means in the tank spaced from and extending over the surface of the inflammable liquid for receiving and holding at least part of the thus transformed at least semi-solid protective fluid; and metallic mesh means in the tank extending slightly under the upper surface of the inflammable liquid, said metallic mesh means being connected at its periphery to the wall of the tank, thereby diminishing the evaporation of the inflammable liquid in case of fire by withdrawing the heat therefrom and conducting it away from the surface thereof to the tank wall.

8. A protective device for tanks containing an inflammable liquid comprising, in combination, a source of a protective fluid adapted to be transformed into at least semi-solid state upon contact with air; means for dispensing the protective fluid into the interior of the tank over the inflammable liquid where it is transformed into at least semi-solid state, said dispensing means including nozzle means arranged above the surface of the inflammable liquid for spreading the protective fluid throughout the interior of the tank over the inflammable liquid; and metallic mesh means in the tank extending slightly under the upper surface of the inflammable liquid, said metallic mesh means being connected at its periphery to the wall of the tank, thereby diminishing the evaporation of the inflammable liquid in case of fire by withdrawing the heat therefrom and conducting it away from the surface thereof to the tank wall.

9. A protective device for tanks containing an inflammable liquid comprising, in combination, a source of a protective fluid adapted to be transformed into at least semi-solid state upon contact with air; temperature responsive means floating on the inflammable liquid connected to said source operable at a predetermined temperature for automatically dispensing the protective fluid into the interior of the tank over the inflammable liquid where it is transformed into at least semi-solid state, said dispensing means including nozzle means arranged above the surface of the inflammable liquid for spreading the protective fluid throughout the interior of the tank over the inflammable liquid; and metallic mesh means in the tank extending slightly under the upper surface of the inflammable liquid, said metallic mesh means being connected at its periphery to the wall of the tank, thereby diminishing the evaporation of the inflammable liquid in case of fire by withdrawing the heat therefrom and conducting it away from the surface thereof to the tank wall.

10. A protective device for tanks containing an inflammable liquid comprising, in combination, a source of a protective fluid adapted to be transformed into at least semi-solid state upon contact with air; temperature responsive means floating on the inflammable liquid connected to said source operable at a predetermined temperature for automatically dispensing the protective fluid into the interior of the tank over the inflammable liquid where it is transformed into at least semi-solid state, said dispensing means including nozzle means arranged above the surface of the inflammable liquid for spreading the protective fluid throughout the interior of the tank over the inflammable liquid; network means in the tank spaced from and extending over the surface of the inflammable liquid for receiving and holding at least part of the thus transformed at least semi-solid protective fluid; and metallic mesh means in the tank extending slightly under the upper surface of the inflammable liquid, said metallic mesh means being connected at its periphery to the wall of the tank, thereby diminishing the evaporation of the inflammable liquid in case of fire by withdrawing the heat therefrom and conducting it away from the surface thereof to the tank wall.

11. A protective device for tanks containing an inflammable liquid comprising, in combination, a source of a protective fluid adapted to be transformed into at least semi-solid state upon contact with air; means floating on the inflammable liquid for dispensing the protective fluid into the interior of the tank over the inflammable liquid where it is transformed into at least semi-solid state; metallic mesh means attached to said floating dispensing means so as to be movable therewith, said metallic mesh means being arranged in the tank extending slightly under the upper surface of the inflammable liquid; and means connecting the metallic mesh means at its perimeter to the tank wall for vertical movement therein in accordance with the level of the surface of the inflammable liquid therein, said metallic mesh means thereby diminishing the evaporation of the flammable liquid in case of fire by withdrawing the heat therefrom and conducting it away from the surface to the tank wall.

References Cited in the file of this patent

UNITED STATES PATENTS

| | | |
|---|---|---|
| 181,911 | Connelly | Sept. 5, 1876 |
| 1,177,331 | Holmes | Mar. 28, 1916 |
| 1,377,431 | Pfeil, Jr. | May 10, 1921 |
| 2,548,384 | Marshall | Apr. 10, 1951 |